United States Patent [19]

Kempter et al.

[11] 3,994,989

[45] Nov. 30, 1976

[54] PAINT BINDER

[75] Inventors: Fritz Erdmann Kempter, Mannheim; Herbert Spoor, Limburgerhof, both of Germany

[73] Assignee: BASF Aktiengesellschaft, Ludwigshafen (Rhine), Germany

[22] Filed: Mar. 24, 1975

[21] Appl. No.: 561,213

[30] Foreign Application Priority Data

Apr. 20, 1974 Germany............................ 2419179

[52] U.S. Cl.................................. 260/831; 204/181; 260/29.2 EP; 260/29.3; 260/33.4 EP; 260/830 TW; 428/413; 428/417; 428/418
[51] Int. Cl.$^2$................... C08G 45/08; C08G 45/06
[58] Field of Search........... 260/830 TW, 831, 51.5, 260/52, 29.2 EP; 204/181

[56] References Cited
UNITED STATES PATENTS 3,264,369  8/1966  Ephraim............................. 260/831
3,790,606  2/1974  Sellet............................. 260/51.5 X Primary Examiner—Theodore E. Pertilla
Attorney, Agent, or Firm—Johnston, Keil, Thompson & Shurtleff

[57] ABSTRACT

Paint binder prepared by reacting Mannich bases (a) with an epoxide resin (b). The Mannich bases (a) are prepared from:
1. a condensed phenol which is free from ether groups and contains at least two phenolic hydroxyl groups,
2. a condensed phenol containing ether groups and also containing at least one phenolic hydroxyl group,
3. a secondary amine containing at least one hydroxyalkyl group and
4. formaldehyde.

The paint binders may be used in protonized form for the cathodic electrocoating of electrically conducting surfaces.

8 Claims, No Drawings

PAINT BINDER

This application discloses and claims subject matter described in German Patent Application No. P 24 19 179.5, filed Apr. 20, 1974, which is incorporated herein by reference.

A number of cationic binder systems for electropaints have been proposed, for example in German Published Application Nos. 2,033,770; 2,163,143; 2,057,799; 1,930,949 and 2,252,536, which systems give good results in some respects, for example as regards anticorrosive properties, but are not satisfactory as regards their overall properties.

One important disadvantage of the prior systems is that they cannot be processed in the pH range from 7 to 9 as used in anodic electrocoating processes (see "Electrodeposition of Coatings", Advances in Chemistry Series 119, pp. 110 to 127, Amer. Chem. Soc., Washington 1973, and Industrial Finishing, Vol. 49, No. 8, 1973, pp. 18 to 23).

Another drawback is that the specified crosslinking reactions are not suitable for the desired pH range and only moderate bath stability is observed, one result of which is that the bath temperature must be kept low, for example below 25° C, and this involves high cooling costs.

It is undesirable to use solvents to stabilize the bath, since this increases the control facilities required and also impairs the binder properties.

It is an object of the present invention to provide paint binders, particularly cationic binders for electropaints, which exhibit substantial improvements over the prior art and have properties meeting present-day demands.

The present invention relates to a paint binder which is substantially free from epoxide groups and which has been prepared by reacting a. Mannich bases of
  $a_1$. at least one condensed phenol which is free from ether groups and contains at least two phenolic hydroxyl groups per molecule,
  $a_2$. at least one condensed phenol containing at least one ether group per molecule and also at least one phenolic hydroxyl group per molecule,
  $a_3$. at least one secondary amine containing at least one hydroxyl group or a mixture of one such secondary amine with one other secondary amine and
  $a_4$. formaldehyde or a formaldehyde-forming compound, with b. at least one epoxide resin.

Particularly advantageous embodiments of the paint binders of the invention are characterized in that the binder has been obtained by reacting from 50 to 90% by weight of component (a) with from 10 to 50% by weight of component (b) and contains from 0 to 30% by weight of a further paint binder and the component ($a_3$) used is diethanolamine or a mixture of diethanolamine and one other secondary amine.

It is particularly advantageous to protonize the paint binders of the invention in conventional manner with an acid.

The present invention also relates to the use of the paint binders of the invention in conventional manner with an acid.

The present invention also relates to the use of the paint binders of the invention in their protonized form for the cathodic electrocoating of electrically conducting surfaces, the bath having pH's of from 6 to 10.2.

One special advantage of the cationic binders of the invention is that, for electrocoating purposes, they may be protonized in conventional manner with only very small amounts of an acid, preferably acetic acid (in an amount of from 1.3 to 2.0% by weight) to give stable dispersions or colloidal dispersions having pH's of from 7.0 to 10.2, and that the processing thereof is advantageously carried out without the use of additional solvents. Another particular advantage of the cationic electrocoating binders of the invention is that they show excellent wet film adhesion (even after aging over a prolonged period) and, in particular, the pigmented systems obtained using said binders exhibit good throwing power. Another special advantage of the binders is that they exhibit good bath stability when aging at 30° C.

Another special advantage of films prepared using binders of the invention is their solvent resistance, their high degree of hardness and flexibility and their excellent anticorrosive properties on iron plate pretreated with zinc and iron phosphate (e.g. BONDER 125, 1040 by Metallgesellschaft) and also their excellent impact resistance even on specimens which have been treated with the usual automotive primers.

The following remarks relate to the individual components used in the preparation of the binders of the invention.

a. Preparation of Mannich bases $a_1$. Suitable condensed phenols which are free from ether groups and contain at least two phenolic hydroxyl groups per molecule are polyfunctional phenols containing one or more aromatic radicals. Particularly suitable components ($a_1$) are phenols of the general formula

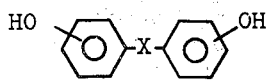

in which the hydroxyl groups are in the ortho- and/or para-position to X and X denotes a straight-chain or branched-chain divalent aliphatic radical of from 1 to 3 carbon atoms or a bridging member of the formula $>SO_2$, $>SO$, $>C=O$ or $-O-$. A particularly suitable component ($a_1$) is bisphenol A. Also suitable are the alkyl derivatives of the above condensed phenols.

$a_2$. Suitable condensed phenols containing one ether group per molecule and at least one phenolic hydroxy group per molecule are products of the general formula

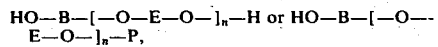

in which B denotes the radical of the formula

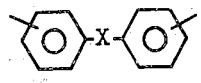

and X has the meanings given under ($a_1$) above, E stands for a hydroxyl-containing radical obtained by the addition of an epoxide compound to a phenolic hydroxyl group, P denotes a phenol or alkylphenol radical and n denotes an integer of from 1 to 3 inclusive, the preferred epoxide compounds (for the production of E) being the glycidyl ethers of bisphenol A, pentaerythritol, glycerol, trimethylolpropane, glycol, glycol ether (EPIKOTE 828 and 162 by Shell) and other polyhydric, preferably dihydric to tetrahydric alcohols.

Other suitable compounds having epoxide groups are nitrogen-containing diepoxides such as are described in U.S. Pat. No. 3,365,471, epoxide resins of 1,1-methylene-bis-(5-substituted hydantoin) (U.S. Pat. No. 3,391,097), diepoxides of bis-imides (U.S. Pat. No. 3,450,711), epoxylated aminomethyl-diphenyl oxides (U.S. Pat. No. 3,312,664), heterocyclic N,N'-diglycidyl compounds (U.S. Pat. No. 3,503,979), aminoepoxy phosphonates (German Pat. No. 1,172,916), 1,3,5-triglycidylisocyanurates and other epoxide-containing materials well known in the art.

Particularly preferred components ($a_2$) are the phenol-containing and virtually epoxide-free reaction products of glycidyl ethers of bisphenol A or polyhydric aliphatic alcohols such as pentaerythritol, trimethylol propane and glycerol with bisphenol A and optionally phenol.

The products generally have molecular weights of from 650 to 1300 and epoxide values of from 0.004 to 0.01 and may be prepared, for example, at temperatures of from 170° to 180° C or, when reaction catalysts are present, at correspondingly lower temperatures.

$a_3$. Examples of suitable secondary amines ($a_3$) containing at least one hydroxyalkyl group are alkyl ethanolamines and alkyl isopropanolamines having from 1 to 6 carbon atoms in the alkyl group. However, we prefer dialkanolamines, particularly diethanolamine, and mixtures of said (di-)-alkanolamines with other secondary amines.

The secondary amines ($a_3$) in the Mannich bases (a), forming an integral part thereof in the form of diethanol aminomethyl groups and alkyl ethanol aminomethyl groups, are of great importance in determining the degree of dispersibility of the binder in the desired pH range of from 6.0 to 10.2 and in govering the degree of crosslinking of the system.

Suitable secondary alkyl amines, which may be used, if desired, together with the hydroxyalkyl-containing amines in the manufacture of the Mannich bases (a), are those of the general formula

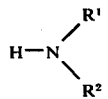

in which $R^1$ and $R^2$ are the same or different and individually denote a straight-chain or branched-chain aliphatic radical of from 1 to 14 carbon atoms, which may or may not contain alkoxy groups. Examples of such suitable secondary amines are di-n-butylamine, di-n-propylamine, diisopropylamine, di-n-pentylamine, di-n-hexylamine, di-n-octylamine, di-2-ethylhexylamine and di-2-alkoxyethylamines such as di-2-methoxyethylamine and di-2-butoxyethylamine. Also suitable are those in which $R^1$ and $R^2$ are joined together to form a ring, for example as in morpholine and piperidine.

Particularly suitable examples of these secondary amines which may optionally be included, are di-n-butylamine, di-n-hexylamine, and di-n-octylamine, di-2-ethylhexylamine and di-2-alkoxyethylamines and mixtures thereof. These secondary amines ($a_3$) are mainly active in influencing the stability of the binders and also contribute to the flow properties and to "internal softening" of the coats of paint produced from the said binders.

The secondary amines ($a_3$) may — due, inter alia, to their method of synthesis — also contain portions of corresponding primary amines, but the proportion of said primary amines should not exceed 10 w/w of the secondary amine.

$a_4$. The formaldehyde or formaldehyde-forming compounds are preferably alcoholic solutions of formaldehyde, for example butanolic solutions, or paraformaldehyde or mixtures thereof.

Preparation of the Mannich bases (a) is carried out by the conventional methods described in the literature, for example as stated in Houben-Weyl, Methoden der organischen Chemie, Vol. XI/1, page 731, 1957.

The proportions of the starting materials used depend on the properties desired, and the ratio of component ($a_1$) to component ($a_2$) is preferably from 1:0.1 to 1:3.0, by weight, and the ratio of the secondary hydroxyl-containing amines to other secondary alkyl amines is preferably from 3:1 to 1:3, by weight.

The proportions of starting materials ($a_1$), ($a_2$) and ($a_3$) for the preparation of the Mannich bases (a) are advantageously chosen such that from about 0.3 to 2.0 and preferably from 0.5 to 1.5 molecules of component ($a_3$) are present for each phenolic hydroxyl group in the mixture of components ($a_1$) and ($a_2$).

The amount of component ($a_4$) to be used in the preparation of the Mannich bases (a) is at least 1 mole and preferably from 1 to 1.3 moles per mole of component ($a_3$).

By varying the proportions of secondary amines, the properties of the binder in the electrocoating bath and in the coating may be controlled, i.e. variation of the proportions of diethanol amine or alkylethanolamine and di-n-butylamine, di-hexylamine, di-2-ethylhexylamine, di-n-octylamine and di-2-alkoxyethylene amine can effect control of the dispersibility of the binder and the reactivity, flow properties, crosslinking, flexibility and anticorrosive properties thereof.

In a particularly preferred embodiment of the present invention, the Mannich bases are prepared using a formaldehyde-forming compound, e.g. paraformaldehyde, in amounts virtually equivalent to the proportion of amine used, in an alcohol such as isopropanol or isobutanol, the component (a) being directly reacted with component (b), i.e. without subsequent reaction with further formaldehyde.

In general, the reaction of component (a) with component (b) is controlled such that the resulting binders of the invention have average molecular weights of from 800 to 5000 and preferably from 1000 to 3000.

The reaction between component (a) and component (b) is generally carried out at temperatures of from 20° to 100° C and preferably from 60° to 80° C, preferably in organic solvents such as alcohols and glycol ethers.

Alternatively, the Mannich bases (a) may be reacted with further formaldehyde as for, say, Novolak formation, but the formaldehyde concentration should not be higher than from 2.5 to 5.0% by weight, based on the Mannich base (a) to minimize the residual formaldehyde content of the binder.

The Mannich condensates (a) are reacted in an amount of from 40 to 90% by weight, preferably from 50 to 90% by weight, with from 10 to 60% and preferably from 10 to 50%, by weight, of epoxide resin (b) to produce the binders of the invention. The degree of etherification of the phenolic component (a₂) controls the stability and also other important properties such as the electric strength.

b. Suitable 1,2-polyepoxides are conventional polyepoxide compounds such as 1. the reaction products of polyhydric phenols, particularly those of the above formula

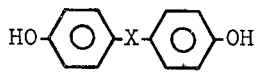

and preferably bisphenol A and epichlorohydrin. Suitable commercial products of this type are for example EPIKOTE 828, 1001, 1004 by Shell Ag or EPOXI 1/33 by Chemapol, CSSR, or 2. the reaction products of polyhydric alcohols such as ethylene glycol, propylene glycol, ethylene diglycol, pentaerythritol, trimethylolpropane or glycerol with epichlorohydrin, for example EPIKOTE 162 by Shell AG.

Other suitable compounds consisting of resins having epoxide groups are nitrogen-containing diepoxides such as are described in U.S. Pat. No. 3,365,471, epoxy resins of 1,1-methylene-bis-(5-substituted hydantoin) (U.S. Pat. No. 3,391,097), diepoxides with bis-imides (U.S. Pat. No. 3,450,711), epoxidized aminomethyl-diphenyl oxides (U.S. Pat. No. 3,312,664), heterocyclic N,N'-diglycidyl compounds (U.S. Pat. No. 3,503,979), amino-epoxy phosphonates (German Pat. No. 1,172,916), 1,3,5-triglycidyl isocyanurates and other epoxide-containing materials well known in the art.

The resin reactant used for this reaction may be virtually any resin containing at least one 1,2-epoxide group. The resin may, for example, come under the general headings of polyethers, polyesters, epoxide resins, acrylic resins and urethane resins.

It is important for the binders of the invention to contain o-alkanolaminomethylphenol radicals, o-alkylaminomethylphenol radicals or o-diethanolaminomethylphenol radicals.

The reaction product of the invention obtained from components (a) and (b) is substantially free from epoxide groups and should not contain more than 0.5 epoxide group per molecule of reaction product at the time of processing.

It is not essential to the invention for the binder to be completely free from 1,2-epoxide groups, since the presence of epoxide groups and their subsequent reaction have no appreciable effect on, say, the stability of the bath.

The paint binders of the invention may be diluted with conventional paint solvents such as isopropanol, decanol or aqueous organic solvents or solvent mixtures and may be applied, with or without pigments, fillers or conventional auxiliaries, to substrates such as wood, metal, glass or ceramics using conventional application methods such as spraying, dipping and flooding, followed by drying and curing at temperatures of more than 170° C. The resulting films are distinguished, for example, by a high degree of hardness and good solvent resistance.

However, the paint binders of the invention are preferably used after protonization with acids such as phosphoric acids and derivatives thereof, preferably with water-soluble carboxylic acids such as acetic acid, formic and lactic acid. The protonized paint binder is water-dilutable and may be applied by the above conventional methods to give films again having very valuable properties. However, the degree of protonization should be kept as low as possible.

The preferred method of using the protonized paint binders of the invention is cathodic electrocoating of electrically conducting surfaces such as the surfaces of metal articles and sheeting of brass, copper, aluminum, iron and steel, which may or may not be chemically pretreated, e.g. phosphated.

The aqueous solutions or dispersions of the paint binders of the invention at least partially in the form of a salt of a water-soluble carboxylic acid may contain auxiliaries which have been rendered electrochemically depositable by cataphoresis, for example pigments, soluble dyes, solvents, flow improvers, stabilizers, curing catalysts, antifoaming agents and other auxiliaries and additives.

To effect cathodic electrocoating, the solids content of the bath is generally adjusted to from 5 to 20% by weight by dilution with de-ionized water. Deposition generally takes place at temperatures of from 15° to 40° C over a period of from 1 to 2 minutes and at bath pH's of from 6.0 to 10.2 and preferably from 7.0 to 9.5, the deposition potentials being from 50 to 500 volts. Following rinsing of the film which had been cathodically deposited onto the electrically conducting article, the said film is cured at from about 170° to 220° C for from 10 to 30 minutes and preferably at from 180° to 200° C for 20 minutes.

The coatings of the invention provide cathodically deposited films showing excellent mechanical properties such as hardness and mar resistance, very good flexibility and strong adhesion to the substrate. Moreover, the layers have the necessary overbaking properties.

In addition, the films obtained are distinguished by a high degree of solvent resistance and good stability in the salt spray test.

In the following Examples the parts and percentages are by weight.

Preparation of component (a₂)

EXAMPLE 1

2100 parts of EPIKOTE 162 (Shell) (glycidyl ether of pentaerythritol and epichlorohydrin having an epoxide value of about 0.57) are reacted with 366.0 parts of phenol at 180° C for 30 minutes. 1824 parts of bispheonol A are then added. The temperature of the batch falls to 120° C during said addition, and the batch is then reheated to 180° C over 30 minutes and maintained at that temperature for 1 hour.

The batch is cooled to about 130° C and dilted with 2100 parts of isobutanol to give a solids content of 65%. The product has an average molecular weight of from 1200 to 1300 and an epoxide value of 0.005.

EXAMPLE 2

288.5 parts of EPIKOTE 828 (Shell) (glycidyl ether of bisphenol A and epichlorohydrin having an epoxide value of about 0.5) are reacted with 342.0 parts of bisphenol A at 180° C for 5 hours. The batch is cooled to 130° C and then diluted with 300 parts of isobutanol to give a solids content of about 76%. The product has an epoxide value of 0.05.

EXAMPLE 3

A Mannich condensate is prepared from 250.0 parts of component ($a_2$) as produced in Example 1, 375.0 parts of bisphenol A, 235.0 parts of diethanolamine, 120.0 parts of di-n-butylamine, 150.0 parts of di-n-hexylamine and 131.0 parts of paraformaldehyde in 250.0 parts of isobutanol in the following manner:

The batch is stirred for 30 minutes at 50° C, heated to 80° C and maintained at that temperature for 3 hours.

After the addition of 412.0 parts of EPOXI 1/33 (Chemapol, CSSR), 164.0 parts of EPIKOTE 162 (Shell) and 150.0 parts of iosbutanol, the reaction is continued for 5 hours at 70° C. Following the addition of 133.0 parts of PLASTIGEN G (BASF) and 150.0 parts of isobutanol, there is obtained a clear resin having an average molecular weight of 1300 to 1400 and a solids content of about 71%.

A 3 liter coating bath is prepared by protonizing a portion of the binder with 1.5% of acetic acid (based on resin solids) and diluting with demineralized water to a solids content of 10%. The bath is stirred for 72 hours at 30° C to remove all solvent therefrom. The bath has a pH of 8.3. Deposition of the binder onto sheet steel which has been coated with BONDER 1040 (Metallgesellschaft) is effected at a potential of 240 volts at 30° C for 2 minutes and gives films which, after heat treatment for 20 minutes at 190° C, show excellent properties and have a layer thickness of 0.018 to 0.020 mm. The films are tested for corrosion by the ASTM test (DIN SS 50,021) and show values of from 0 to 1.5 mm after a test period of 500 hours. The stability of the bath was tested by allowing the bath to age for 1000 hours at 30° C followed by deposition under the above conditions. The films then obtained show satisfactory properties.

EXAMPLE 4

860 parts of the binder prepared in Example 3 are protonized with 9 parts of acetic acid, diluted with 600 parts of demineralized water and, after the addition of 120 parts of iron oxide red AC 5052 (Bayer), milled in a ball mill to a particle size of less than 10 $\mu$. The batch is then further diluted to a solids content of 10% and is stirred at 30° C for 72 hours to remove the solvent.

For the purpose of measuring the throwing power, use is made of a boat of phosphated steel plate as employed in the test method described by M. Maisch in "Industrie Lackierbetrieb" 33, p. 312 (1965), which boat is coated for 2 minutes at 30° C at a potential of 360 volts and using a series resistance of 25 ohms. The thickness of the film obtained on the outside of the boat, after baking for 20 minutes at 190° C, is from 0.020 to 0.022 mm, whilst that obtained on the inside of the boat is 0.018 mm.

EXAMPLE 5

A Mannich condensate is prepared as described in Example 3 from 163.5 parts of the component ($a_2$) obtained in Example 2, 187.5 parts of bisphenol A, 140.0 parts of diethanolamine, 54.0 parts of di-n-butylamine, 74.5 parts of di-n-hexylamine and 69.0 parts of paraformaldehyde in 125.0 parts of isobutanol. Following the addition of 150.0 parts of EPOXI 1/33 (Chemical, CSSR), 82.0 parts of EPIKOTE 162 (Shell) and 60 parts of isobutanol, the reaction is continued for 5 hours at 70° C. The clear resin has a solids content of 73%. Preparation and use of the bath is as described in Example 3.

Deposition of the binder onto sheet steel which has been coated with BONDER 1040 (Metallgesellschaft) is carried out at 200 volts and 30° C for 2 minutes and gives films which, after heat treatment at 190° C for 20 minutes, have excellent properties and a thickness of from 0.015 to 0.020 mm.

Testing by the ASTM salt spray method (DIN SS 50,021) gives values of from 1.5 to 2 mm after 500 hours.

EXAMPLE 6

A Mannich condensate is produced as described in Example 3 from 687.5 parts of the component ($a_2$) as produced in Example 1 (in the form of a 70% solution in isobutanol), 375.0 parts of bisphenol A, 273 parts of diethanolamine, and 108.0 parts of paraformaldehyde in 250 parts of isobutanol.

Following the addition of 250.0 parts of EPOXI 1/33 (Chemapol, CSSR), 246 parts of EPIKOTE 162 (Shell) and 310 parts of isobutanol, the reaction is continued for 5 hours at 70° C.

There is obtained a clear resin having a solids content of 70%. A 3 liter coating bath is prepared by protonizing a portion of the binder with 1.5% of acetic acid (based on resin solids) and dilution with demineralized water to a solids content of 10%.

Prior to deposition, the bath is stirred for 72 hours at 30° C to remove solvent. The pH of the bath is 8.3.

Deposition of the binder onto steel plate which has been coated with BONDER 1040 (Metallgesellschaft) is carried out at a bath temperature of 30° C, a potential of 210 volts and for a period of 2 minutes. Following pretreatment for 20 minutes at 190° C, the smooth films obtained show excellent properties. The film thickness is from 0.018 to 0.020 mm. ASTM corrosion testing (DIN SS 50,021) of films obtained on metal phosphated with, say, BONDER 1040 gives values of from 0.5 to 1.5 mm after a test period of 500 hours.

EXAMPLE 7

360 parts of the binder prepared in Example 6 are protonized with 10 parts of acetic acid and diluted with 500 parts of demineralized water. After the addition of 180 parts of iron oxide red AC 5052 (Bayer), the batch is milled in a ball mill to a particle size of less than 10 $\mu$. There are then added a further 650 parts of the binder obtained in Example 6 and 2 parts of acetic acid, and the batch is diluted with demineralized water to give an approximately 6 liter bath having a concentration of 12.5%. This bath is aged for 72 hours at 30° C with stirring to remove solvent. The pH is 8.1.

Measurement of the throwing power is carried out by coating a metal boat for 2 minutes at 30° C and a potential of 360 volts, using a series resistance of 25 ohms. Only the outer surface of the boat had been phosphated prior to deposition. The thickness of the film obtained on the outside of the boat is found to be from 0.025 to 0.030 mm after baking for 20 minutes at 190° C. The film thickness on the inside of the boat is found to be 0.020 mm.

We claim:
1. A substantially epoxide-group-free paint binder which has been obtained by reacting
   a. Mannich bases of

$a_1$. at least one condensed phenol which is free from ether groups and contains at least two phenolic hydroxyl groups per molecule, $a_2$. at least one condensed phenol containing at least one ether group per molecule and also at least one phenolic hydroxyl group per molecule, $a_3$. at least one secondary amine containing at least one hydroxyalkyl group or a mixture of one such secondary amine with one other secondary amine and $a_4$. formaldehyde or a formaldehyde-forming compound, with b. at least one epoxide resin containing at least one 1,2-epoxide group.

2. A paint binder as claimed in claim 1 in which the reaction product of components (a) and (b) has a molecular weight of from 800 to 5000.

3. A paint binder as claimed in claim 1 and obtained by reacting Mannich bases (a) which have been obtained under the following conditions:

The ratio of components ($a_1$) to ($a_2$) is from 1:0.1 to 1:3, by weight;

from about 0.3 to 2.0 molecules of component ($a_3$) are present for each phenolic hydroxyl group in the mixture of components ($a_1$) and ($a_2$);

at least one mole of component ($a_4$) is used for every mole of component ($a_3$).

4. A paint binder as claimed in claim 1 and which has been obtained by reacting from 50 to 90% by weight of component (a) with from 10 to 50% by weight of component (b).

5. A paint binder as claimed in claim 1 and in which the component ($a_1$) is bisphenol A.

6. A paint binder as claimed in claim 1, wherein the component ($a_2$) is a reaction product of
I. a glycidyl ether of bisphenol A, pentaerythritol, trimethylolpropane or glycerol,
II. bisphenol A and
III. optionally phenol,
which product has a molecular weight of from 650 to 1300 and an epoxide value of from 0.004 to 0.01.

7. A paint binder as claimed in claim 1, wherein the component ($a_3$) is diethanolamine or a mixture of diethanolamine and one other secondary amine.

8. A paint binder as claimed in claim 1 and protonized with phosphoric acid and derivatives thereof or water-soluble carboxylic acids in conventional manner.

* * * * *